(12) United States Patent
Forutanpour

(10) Patent No.: US 9,552,097 B2
(45) Date of Patent: Jan. 24, 2017

(54) TECHNIQUES FOR DISCERNING BETWEEN INTENDED AND UNINTENDED GESTURES ON WEARABLE TOUCH-SENSITIVE FABRIC

(71) Applicant: QUALCOMM Incorporated, San Diego, CA (US)

(72) Inventor: Babak Forutanpour, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 14/607,986

(22) Filed: Jan. 28, 2015

(65) Prior Publication Data

US 2016/0216825 A1     Jul. 28, 2016

(51) Int. Cl.
*G06F 3/041* (2006.01)
*G06F 3/044* (2006.01)
*G06F 3/0488* (2013.01)

(52) U.S. Cl.
CPC ............ *G06F 3/0416* (2013.01); *G06F 3/044* (2013.01); *G06F 3/0414* (2013.01); *G06F 3/0418* (2013.01); *G06F 3/04883* (2013.01); *G06F 2203/04102* (2013.01); *G06F 2203/04808* (2013.01)

(58) Field of Classification Search
CPC ....... G06F 3/041–3/04897; G06F 2203/04105; G06F 2203/04106; G06F 2203/04808
See application file for complete search history.

(56) References Cited

U.S. PATENT DOCUMENTS

| | | | |
|---|---|---|---|
| 8,199,126 B1 | 6/2012 | Taubman | |
| 8,269,727 B2 | 9/2012 | Westerman et al. | |
| 8,665,240 B2* | 3/2014 | Westerman | G06F 3/0235 345/173 |
| 8,928,602 B1* | 1/2015 | Wan | G01R 33/06 178/18.07 |
| 2011/0273394 A1 | 11/2011 | Young et al. | |
| 2013/0215040 A1 | 8/2013 | Bose et al. | |
| 2013/0232095 A1 | 9/2013 | Tan et al. | |
| 2014/0340320 A1 | 11/2014 | Vanblon et al. | |
| 2015/0363035 A1* | 12/2015 | Hinckley | G06F 3/0383 345/173 |
| 2016/0179284 A1* | 6/2016 | McGowan | G06F 3/0418 345/173 |

OTHER PUBLICATIONS

International Search Report and Written Opinion—PCT/US2015/067149—ISA/EPO—Apr. 4, 2016.

* cited by examiner

*Primary Examiner* — Larry Sternbane
(74) *Attorney, Agent, or Firm* — Kilpatrick Townsend & Stockton

(57) ABSTRACT

Techniques are described to discern between intentional and unintentional gestures. A device receives a first input from one or more sensors that are coupled to a flexible material to detect input from the user provided by manipulation of the flexible material. In addition, the device receives a second input from one or more environmental sensors that are coupled to the user to detect environmental conditions associated with the user. The device correlates the first input and the second input to determine whether the first input is an intentional input by the user.

30 Claims, 9 Drawing Sheets

TECHNIQUES FOR DISCERNING BETWEEN INTENDED AND UNINTENDED GESTURES ON WEARABLE TOUCH-SENSITIVE FABRIC

TECHNICAL FIELD

The present disclosure relates generally to pressure sensitive membranes, and in particular, to discerning between intended and unintended gestures on pressure sensitive membranes.

BACKGROUND

Electronic devices have become increasingly more popular in recent years. These devices usually receive input from a user through an input interface such as a keyboard, touch screen, touch pad, a mouse, etc. Users prefer to carry smaller devices with higher capabilities. Designing more efficient user interfaces remains a challenge.

SUMMARY

In one example, a method for discerning between intended and unintended inputs on a flexible material is disclosed. The method generally includes, in part, receiving a first input from one or more pressure sensors. The one or more pressure sensors is coupled to the flexible material to detect input from a user provided by manipulation of the flexible material. The method further includes receiving a second input from at least one sensor. The at least one sensor is coupled to the user to detect environmental conditions associated with the user. The method further includes correlating the first input and the second input to determine whether the first input is an intentional input by the user.

In one example, the at least one sensor is attached to the flexible material. In another example, the at least one sensor is attached to a portion of traditional fabric worn by the user, the portion of traditional fabric being in contact with the flexible material.

In one example, the one or more pressure sensors are dispersed at predetermined locations on the flexible material. In one example, correlating the first input and the second input includes, in part, comparing at least one of: a number of peaks in a predefined duration, magnitude of each peak, time of start and stop of each peak, and speed of change in the first and the second inputs.

In one example, the method further includes determining that the first input is unintentional based on correlation between the first and the second inputs being larger than a threshold. In one example, the method further includes classifying the first input as one of a plurality of touch commands based on the first input being determined to be intentional. In one example, the second input comprises data from the at least one sensor just before start time of the first input up to slightly after the first input is finished.

In one example, an apparatus for discerning between intended and unintended inputs on a flexible material is disclosed. The apparatus generally includes, in part, means for receiving a first input from one or more pressure sensors. The one or more pressure sensors is coupled to the flexible material to detect input from a user provided by manipulation of the flexible material. The apparatus further includes means for receiving a second input from at least one sensor, the at least one sensor coupled to the user to detect environmental conditions associated with the user, and means for correlating the first input and the second input to determine whether the first input is an intentional input by the user.

In one example, an apparatus for discerning between intended and unintended inputs on a flexible material is disclosed. The apparatus generally includes at least one processor and a memory coupled to the at least one processor. The at least one processor is configured, in part, to receive a first input from one or more pressure sensors. The one or more pressure sensors is coupled to the flexible material to detect input from a user provided by manipulation of the flexible material. The processor is further configured to receive a second input from at least one sensor, the at least one sensor coupled to the user to detect environmental conditions associated with the user, and correlate the first input and the second input to determine whether the first input is an intentional input by the user.

In one example, a processor-readable medium for discerning between intended and unintended inputs on a flexible material is disclosed. The processor-readable medium generally includes processor-readable instructions configured to cause a processor to receive a first input from one or more pressure sensors, the one or more pressure sensors being coupled to the flexible material to detect input from a user provided by manipulation of the flexible material, receive a second input from at least one sensor, the at least one sensor being coupled to the user to detect environmental conditions associated with the user, and correlate the first input and the second input to determine whether the first input is an intentional input by the user.

BRIEF DESCRIPTION OF THE DRAWINGS

An understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

User interfaces, including input and output interfaces, are typically used by a device to interact with a user. Input interfaces may include keyboards, mice, touch screens, touch pads, and any other means that can be used to enter an input to the device. Output interfaces may include displays, speakers, and any other means that can be used by a device to show an output to a user. As an example, a user may use a device, such as a keyboard, a mouse, or any other devices to interact with a computer or processor (e.g., a phone, smart appliance, or the like). In another example, the user may utilize a remote control to interact with a television. Similarly, a touch pad may be used to interact with a wearable computing device, such as a head mounted display (HMD). A HMD is a display device that has a small display optic in front of one or both eyes. HMDs can be worn on the head, as a pair of glasses, or as part of a helmet.

Figure 1:
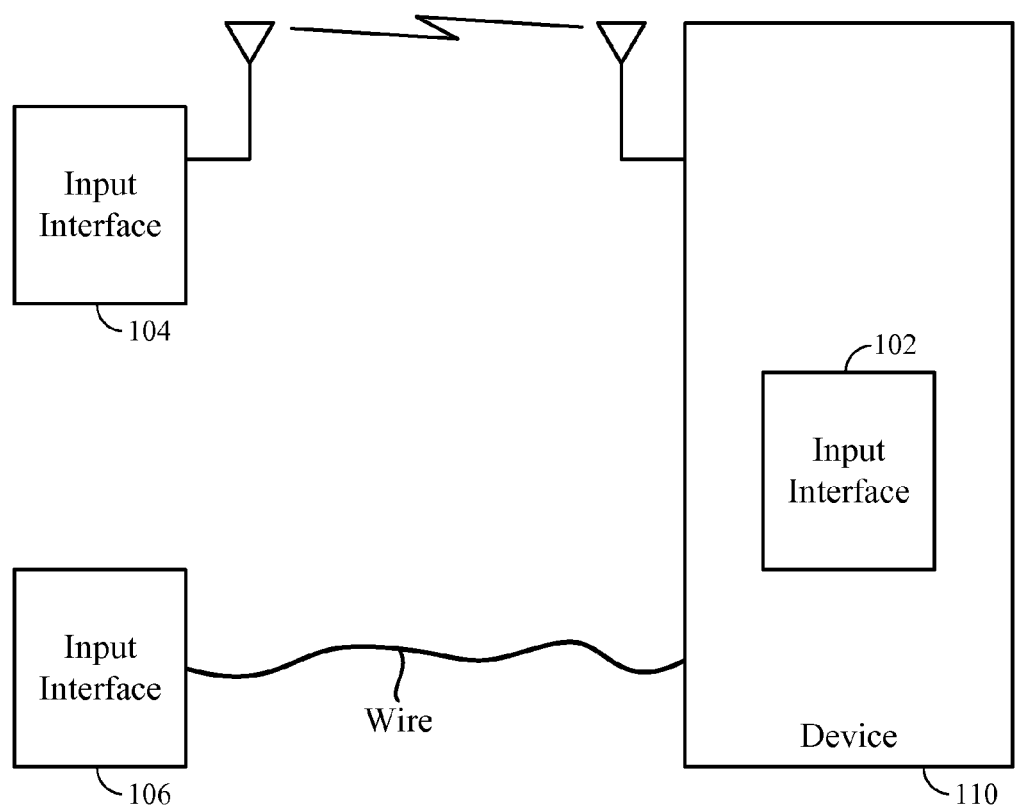
FIG. 1 illustrates an exemplary device receiving input from an input interface.

FIG. 1 illustrates exemplary input interfaces that can be used to interact with a device 110, according to one embodiment. Device 110 may include one or more processors capable of interacting with input interfaces. For example, device 110 may be a mobile device, a laptop, a tablet, an HMD, a smart appliance, or any other type of fixed or portable devices. As illustrated, input interface 102 (e.g., a touch pad) is a part of the device 110. Input interface 104 interacts with the device wirelessly through Bluetooth or using other wireless technologies. Input interface 106 (e.g., a keyboard) is connected to the device through a wire.

In one embodiment, a user interacts with a device discretely. To achieve this, the user can wear clothing materials made of touch-sensitive and/or pressure-sensitive fabrics. The pressure-sensitive fabric may be able to wirelessly communicate with another device using a wireless technology, such as Bluetooth. For example, the user can perform touch gestures on his sleeve, arm, or pocket. One of the challenges encountered in on-body gesture detection systems is discerning between intended and/or unintended gestures. Certain embodiments include techniques for discerning between intended and unintended gestures. For example, when pressure is detected on a pressure sensitive fabric, one embodiment determines if the pressure was caused intentionally or unintentionally.

An intended gesture refers to a gesture that was preformed intentionally by the user to interact with the device. For example, the user may perform pinch in, pinch out, swipe left, swipe right and/or other gestures on a pressure sensitive membrane, such as a pressure sensitive fabric to give commands to the device. On the other hand, an unintended gesture refers to a unintentional gesture that is detected by a device. For example, if a pressure sensitive fabric is put in a pocket of the user, pressure may be applied to the pressure-sensitive fabric when a user is sitting. However, this pressure is not an intended gesture, and should be ignored. As another example, the pocket itself may be made of pressure-sensitive fabric, in which folds in the fabric and/or generally moving and bending fabric may apply unintentional pressure to the pressure sensors in the fabric.

Figure 2:
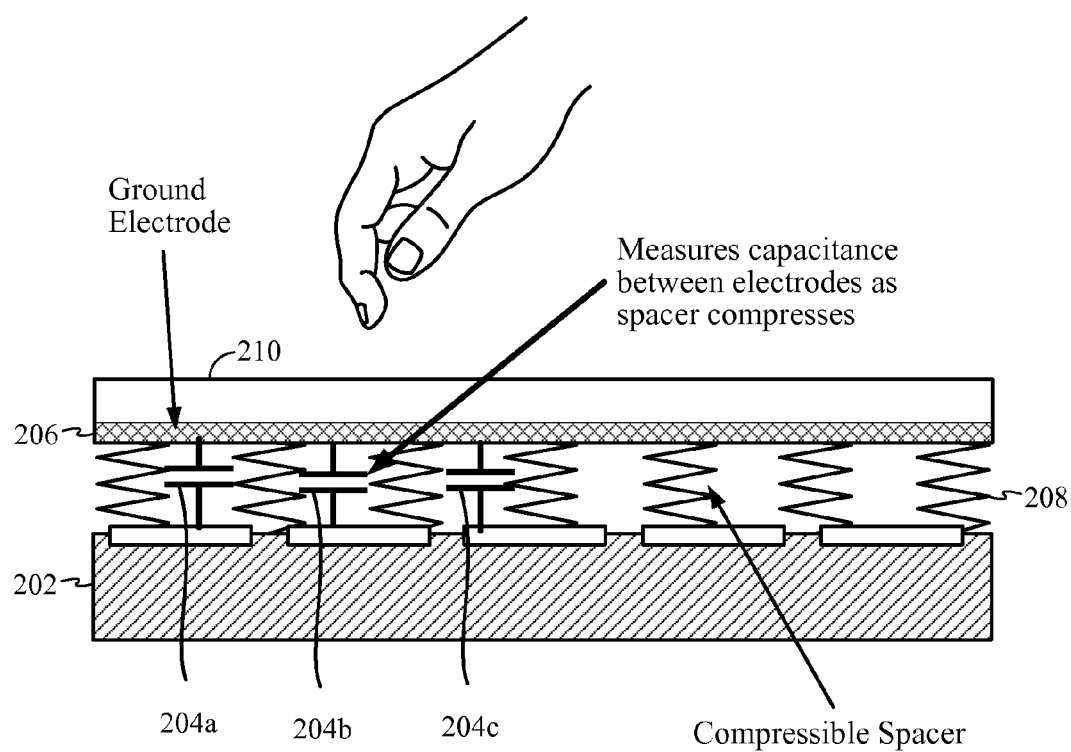
FIG. 2 illustrates an exemplary pressure-sensitive fabric, in accordance with certain embodiments of the present disclosure.

FIG. 2 illustrates an exemplary pressure sensor (e.g., capacitive tactile sensor), in accordance with certain embodiments of the present disclosure. A pressure sensitive membrane and/or fabric can include multiple pressure sensors that are spaced at a certain distance from each other. An example, a pressure sensitive fabric may include 24 capacitive electrodes in an area of approximately two square-inches.

As illustrated in FIG. 2, the capacitive tactile sensor may include a pressure-sensitive membrane 210 (e.g., fabric), one or more capacitive electrodes (e.g., 204a, 204b, 204c, etc.) and a number of compressible spacers 208 disposed on a base layer 202. The pressure sensitive membrane 210 detects pressure corresponding to changes in the capacitive discharge time of any of the capacitive electrodes. For example, when pressure is applied to an electrode (e.g., 204b), it moves closer or further from the ground plane 206.

Figure 3A:
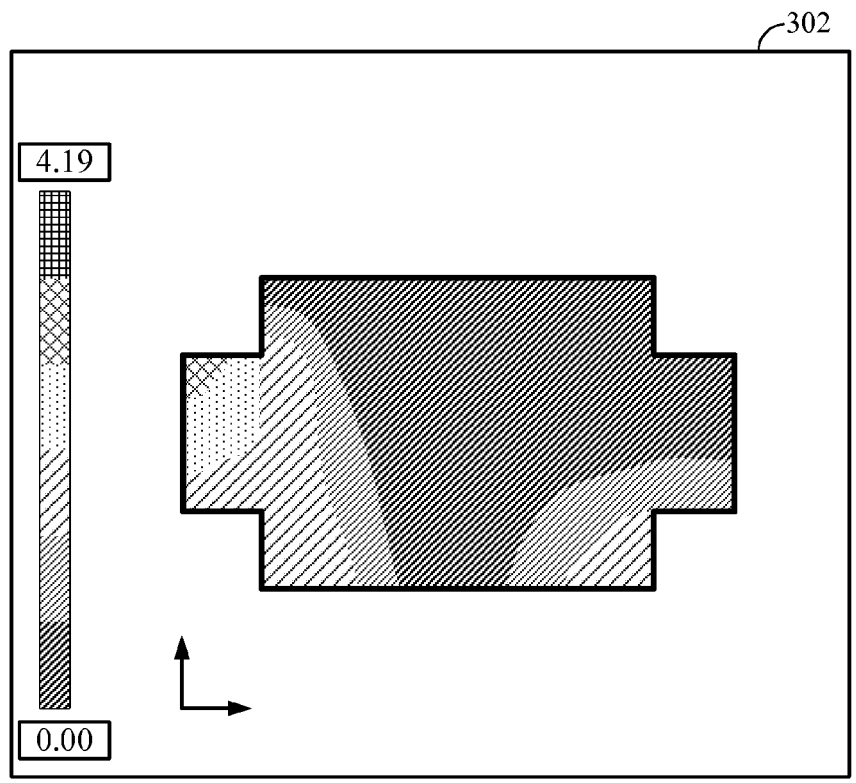
FIGS. 3A and 3B illustrate exemplary heat maps corresponding to intended and unintended gestures, respectively, in accordance with certain embodiments of the present disclosure.
Figure 3B:
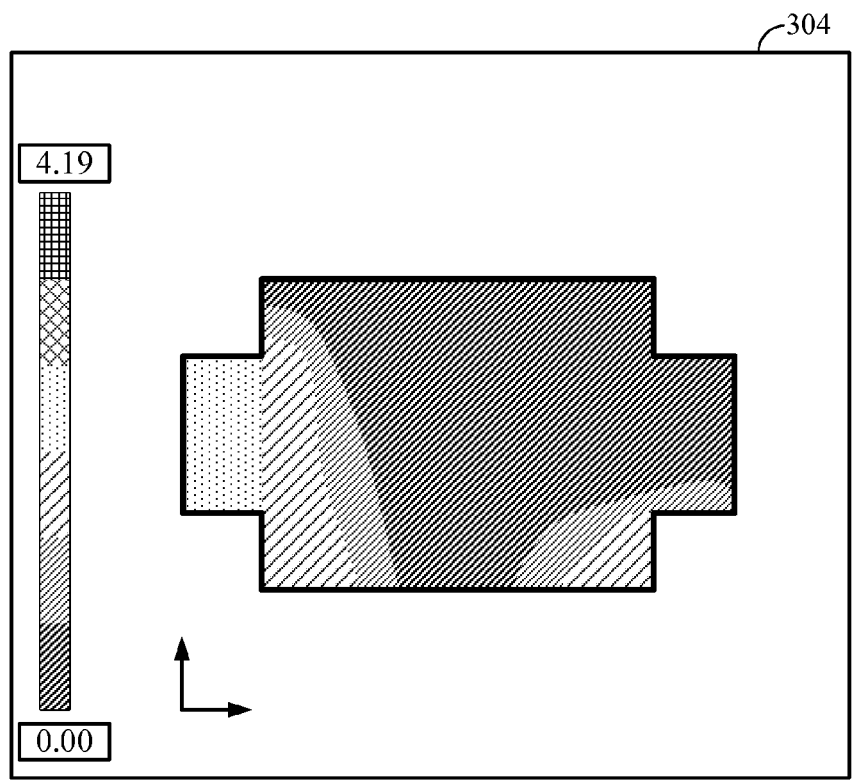

As mentioned before, pressure may be applied on the pressure sensitive fabric either intentionally or unintentionally. Unintentional inputs that are detected by the fabric can at times appear very similar to intended gestures in a classifier's vocabulary (as shown in FIGS. 3A and 3B). A classifier's vocabulary refers to the intended gestures (e.g., vocabulary) that are defined for a device. In general, each of the intended gestures correspond to a specific command that should be performed by the device. As an example, classifier's vocabulary may include tap, double tap, pinch in, pinch out, swipe and any other touch/pressure commands.

FIGS. 3A and 3B illustrate exemplary heat maps corresponding to an intended and an unintended gesture, in accordance with certain embodiments of the present disclosure. FIG. 3A illustrates a heat map 302 corresponding an intended pinch—in gesture. FIG. 3B illustrates a heat map 304 corresponding to an unintended pressure, that is caused by a user siting down on a chair. As can be seen, the heat maps 302 and 304 show similar characteristics, although they correspond to different events, one being an intended pressure on the fabric and the other one being an unintended pressure.

Certain embodiments reduce number of false positives in detecting gestures on a pressure sensitive fabric by correlating the measurements from pressure sensors with measurements from other types of sensors, such as environmental sensors. In general, environmental sensor may refer to any types of sensors that measures data about the environment, such as inertial measurement unit (IMU) sensors (e.g., accelerometers, Gyro sensors, or the like), sound measurements, temperature sensors, or the like. In general, the environmental sensors should be co-located with the pressure sensors either in a single device or in two or more co-located devices. For example, one or more pressure sensitive sensors, accelerometers and Gyros may be located the same device. In another example, a pressure-sensitive fabric may be attached to the casing of a mobile device.

A false positive in detecting gestures may refer to detecting a gesture when the pressure-sensitive fabric is pressed although the pressure was applied to the fabric unintentionally.

Figure 4:
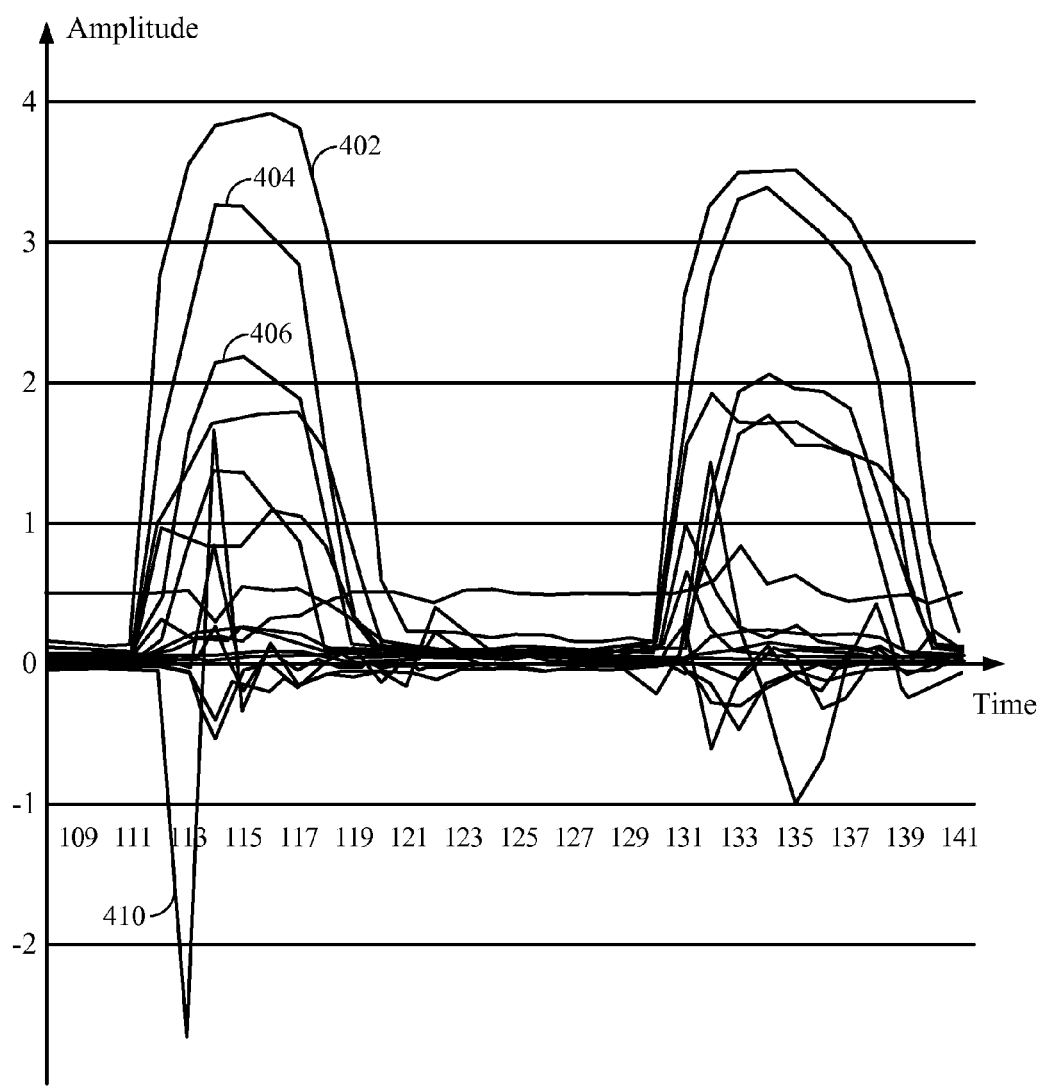
FIG. 4 illustrates exemplary measurements from multiple pressure sensors and an accelerometer, in accordance with certain embodiments of the present disclosure.

FIG. 4 illustrates example measurements from multiple pressure sensors and a co-located accelerometer, in accordance with certain embodiments of the present disclosure. As illustrated, curves 402, 404 and 406 correspond to measurements from three pressure sensors. In addition, curve 410 illustrates measurements from a motion sensor (e.g., 6-degrees of freedom (6DOF) inertial measurement unit (IMU) sensor). As can be seen, roughly around the same time that the pressure is applied to the pressure sensors, the accelerometer is measuring variations in motion of the fabric. As a result, by analyzing the shape of the motion and measurements from the pressure sensors correlation between curves can be determined.

In order to reduce number of false positives, one embodiment disregards any input from the pressure-sensitive fabric if an accompanying motion sensor detects motion. In one example, one or more motion sensors may be placed in every n inches of the fabric. For example, if a motion sensor detects motion within certain amount of time before, or at the same time that the pressure is detected, the pressure input may be disregarded. In one example, the measurements from the motion sensor may exactly correlate with the measurements from the pressure sensor for a specific duration of time. In another example, the measurements from the motion sensor may partially correlate with the measurements from the pressure sensors. Depending on the amount of correlation between the measurements from the motion and/or pressure sensors, the device may decide to keep or disregard the input from the pressure sensors. In this scheme, the user may need to remain still while performing gestures.

In one example architecture, a device may include a processor and a Bluetooth transmitter that are connected to a pressure sensitive membrane (e.g., fabric). In some embodiments, the pressure sensitive membrane may include any number of pressure sensors. In one example, the pressure sensitive membrane has 24 pressure sensors. In general, number of pressure sensors may correspond to the size of the pressure sensitive membrane (e.g., the bigger the membrane, the more pressure sensors can fit in it). The device can also have one or more environmental sensors which record 6DOF, such as an accelerometer, Gyro, or IMU, and any other type of environmental data. The device samples data from some or all of the sensors at a predefined sampling rate (e.g., 32 samples-per-second). In one embodiment, the device could be a part of a complete device (e.g., a portion of a mobile device). In another embodiment, the device could be a stand-alone device that can be used for sole purpose of receiving a gesture and wirelessly transmitting the received data to another device to provide control input for the other device.

Certain embodiments distinguish between intended and unintended gestures by analyzing and/or correlating measurements from different types of sensors (e.g., motion sensors, pressure sensors, microphones, etc.). For example, when pressure is detected on the pressure sensitive fabric, one or more of the additional sensor measurements from collocated sensors are analyzed to see if the pressure sensitive fabric, or a device that includes the pressure-sensitive fabric was moving before and/or during the detected pressure/gesture. In one embodiment, sensor measurements are analyzed during time durations $T_1$ before the detected gesture and/or $T_2$ after the detected gesture. Time duration $T_2$ may include the duration in which the pressure sensitive fabric was pressed. In one embodiment, motion of the pressure-sensitive fabric before and after the detected pressure is analyzed. Measurements from the co-located motion sensors (e.g., 6DOF) are compared with the measurements from pressure sensors on the pressure-sensitive fabric to determine whether or not a correlation exists between the detected motion and the detected pressure.

In one embodiment, the correlation between the measurements from the pressure sensors and the motion sensors is determined by analyzing magnitude of the detected pressure and/or motion, slope of peaks in each set of measurements, rate or speed of the detected motion, number of peaks in a predefined duration, and the like. If correlation between the detected pressure and measurements from other sensors is greater than a threshold, the detected pressure may be as a result of an unintentional gesture. Therefore, the system may ignore the detected gesture. For example, if a user keeps the pressure-sensitive fabric in his pocket, while sitting, some unintentional pressure could be applied on the pressure sensitive fabric, which should not be considered as an intentional gesture.

Figure 5:
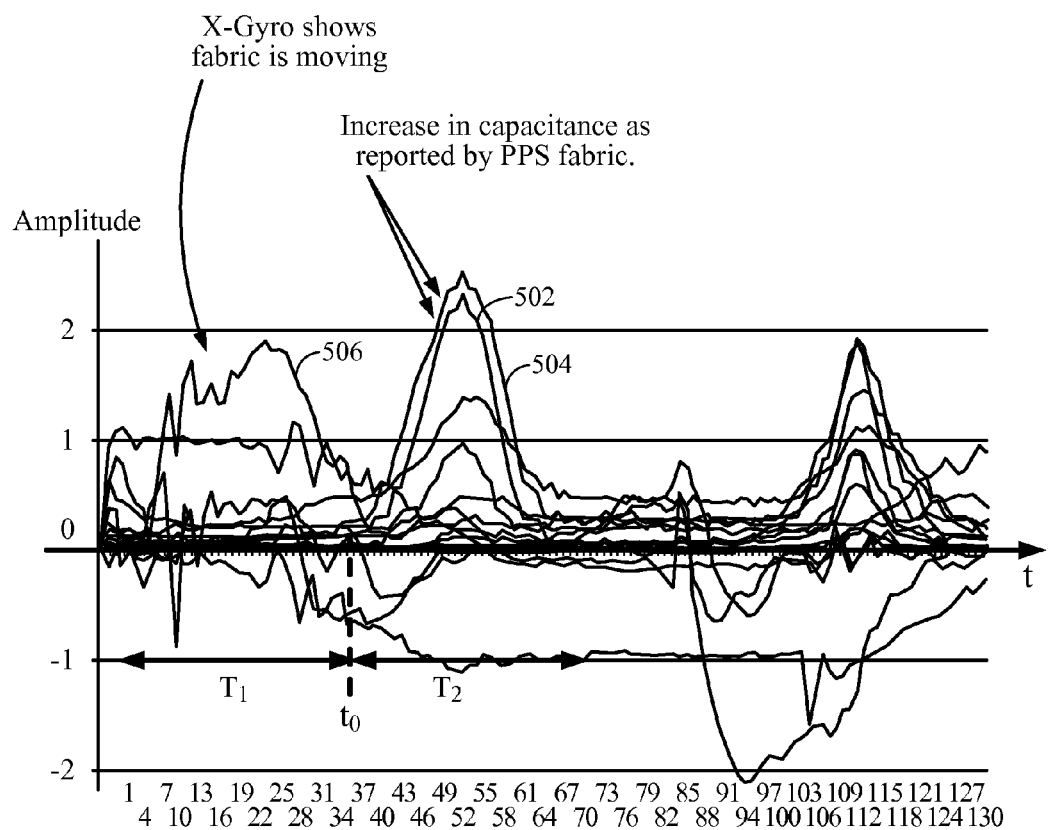
FIG. 5 illustrates exemplary measurements from pressure sensors and environmental sensors corresponding to a user sitting down while carrying a device in his pocket, in accordance with certain embodiments of the present disclosure.

FIG. 5 illustrates exemplary measurements from multiple pressure and environmental sensors corresponding to a user sitting down while carrying a device in his pocket, in accordance with certain embodiments of the present disclosure. In this figure, curves 502 and 504 show measurements from two pressure sensors over time. In addition, curve 506 illustrates measurements from a Gyro sensor. Measurements from the Gyro sensor shows fabric moved approximately one second before fabric's pressure sensor detected pressure. In this example, the user puts the device in his jeans and the pressure is applied by the jean pocket folding at the hip. As can be seen in the graph, a single smooth rolling motion affected all the sensors (e.g., Gyro and pressure sensors). This correlation means the gesture is likely unintentional and the pressure is applied to the pressure sensors unintentionally (e.g., false positive). Therefore, in one embodiment, this gesture is discarded because there is a strong correlation between the motion and the pressure applied to fabric.

In one embodiment, a correlation metric can be defined to compare the measurements from different sensors. In general, any of the known methods in the art may be used to determine correlation between these measurements. In one example, signals $S_1$ and $S_2$ are received from sensors $P_1$ and $P_2$, respectively. These signals are passed through low-pass filters and are normalized. The low pass filters are used to smoothen the signals. Moreover, normalization converts the two signals into similar ranges. As an example, the two signals may be normalized to be from zero to one. Alternatively, if signal $S_1$ varies between zero and $N_1$, and signal $S_2$ varies between zero and $N_2$ (e.g., $N_1 > N_2$), signal $S_2$ can be multiplied by $$\frac{N_1}{N_2}$$

to vary between zero and $N_1$.

Next, the two normalized signals can be compared to identify parts of the signals that are different. For example, the two signals can be compared using a comparison method, such as sum of absolute difference (SAD). In one embodiment, SAD can be performed on the normalized signals for several different shifts in time. For example, normalized $S_1$ signal can be shifted K units in time (e.g., K=10 ns) prior to comparison with normalized $S_2$ signal. In one embodiment, the smallest of SAD results corresponding to different shifted versions of the signals may be used to determine their correlation metric.

In one embodiment, the correlation metric may be defined based on difference in slope of the two signals, number of peaks, and/or any other signal characteristics. In one embodiment, FFT (Fast Fourier Transform) can be applied to the signals to compare their frequency signature. Any other method can be used to define a correlation metric to compare signals without departing from the teachings of the present disclosure.

In addition, a threshold may be defined corresponding to the correlation between measurements from different sensors. For example, if the correlation metric is larger than the threshold, the gesture may be declared as un-intentional. Similarly, if the correlation metric is less than or equal to the threshold, the detected gesture may be declared as intentional. The detected gesture may then be sent to the classifier for further analysis (e.g., detecting type of gesture, such as tap, double tap, etc.).

Figure 6:
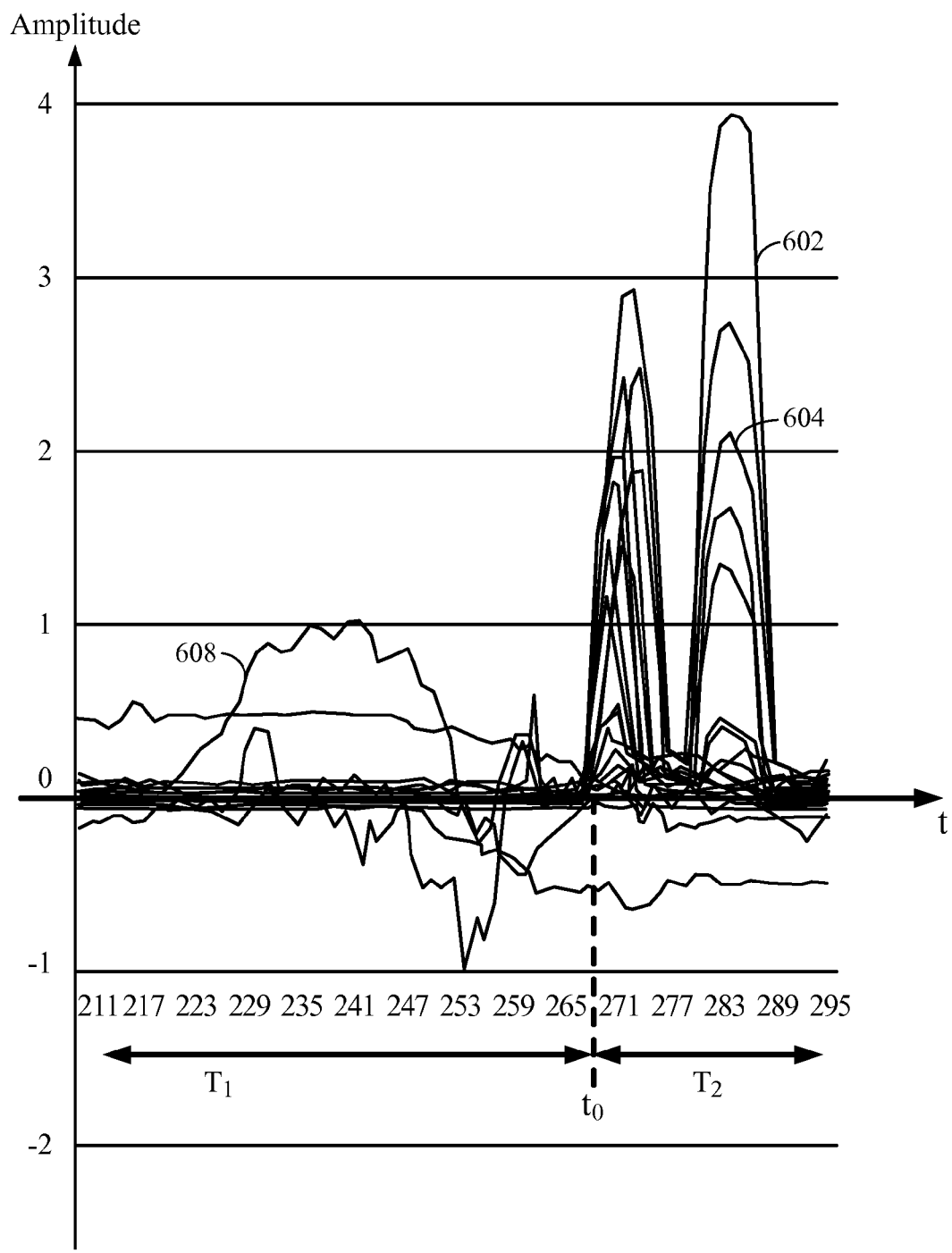
FIG. 6 illustrates exemplary measurements from pressure sensors and environmental sensors corresponding to a user performing an intentional gesture while sitting down, in accordance with certain embodiments of the present disclosure.

FIG. 6 illustrates exemplary measurements from pressure sensors and environmental sensors corresponding to a user performing an intentional gesture while sitting down, in accordance with certain embodiments of the present disclosure. In this figure, curves 602 and 604 correspond to measurements from pressure sensors. In addition, curve 608 corresponds to measurements from Gyro sensor. As can be seen the fabric moved before the pressure pad detected change. But the Gyro measurements (curve 608) do not correlate with the input gesture (e.g., double tap). Hence, the detected gesture can be declared as intentional. In this example, the user was intentionally interacting with the fabric, by performing a double tap gesture while sitting down. As can be seen, the detected gesture, and motion of the fabric do not show the same shape before the detected gesture.

In one embodiment, the device continuously monitors motion of the pressure sensitive fabric and/or pocket using one or more environmental sensors (e.g., an IMU, Gyro, sound measurement sensors, etc.). Increasing number of environmental sensors may increase accuracy of discerning between the intended and unintended gestures (e.g., discerning between fabric of the pocket (e.g., traditional fabric) vs. finger as source of the pressure on the pressure sensitive fabric).

In one embodiment, the measurements from environmental sensors are stored in a memory for a predefined duration (e.g., duration $b_1$). In addition, the device may continuously monitor the pressure sensors and store the measurements from the pressure sensors into memory for time duration $b_2$. If pressure is detected by the pressure sensors (e.g., one or more of the sensors show values more than a predefined threshold p, the device analyzes motion of the fabric for a time duration before and/or after the detected pressure. For example, the device analyzes the motion for time duration $T_1$ before start of the detected pressure and/or a time duration $T_2$ after start of the detected pressure. In addition, a correlation is determined between measurements from the pressure sensors that detected the pressure and the measurements from the environmental sensors (e.g., motion sensors).

Figure 7:
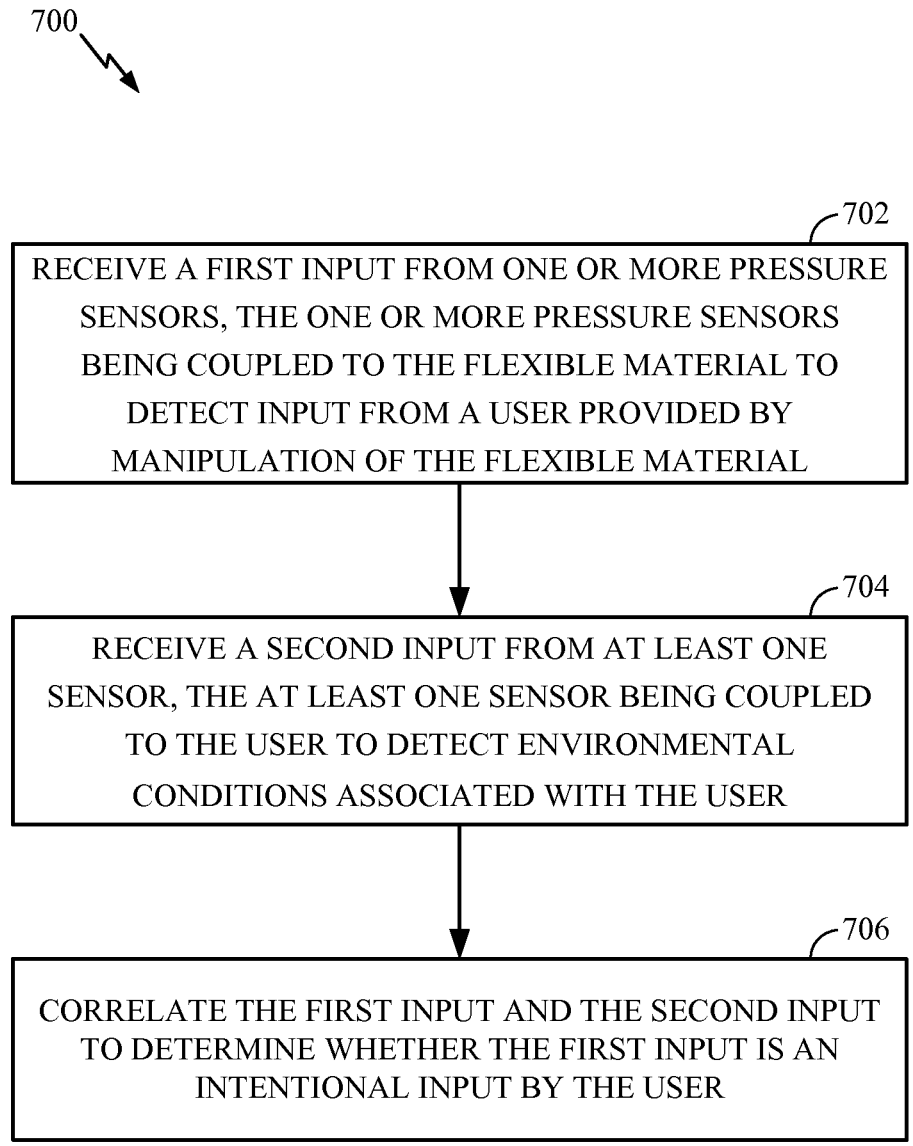
FIG. 7 illustrates example operations that may be performed by a device to discern between intentional and unintentional gestures, in accordance with certain embodiments of the present disclosure.

FIG. 7 illustrates example operations that may be performed by a device to discern between intentional and unintentional gestures on a flexible material, in accordance with certain embodiments of the present disclosure. At 702, a first input is received from one or more pressure sensors. The one or more pressure sensors are coupled to the flexible material to detect input from the user provided by manipulation of the flexible material. At 704, a second input is received from at least one sensor. The at least one sensor being coupled to the user to detect environmental conditions associated with the user. At 706, the first input and the second input are correlated to determine whether the first input is an intentional input by the user.

In one embodiment, the first sensor is a pressure sensor, and the second sensor is an environmental sensor (e.g., a motion sensor, a microphone, etc.). In one embodiment, the flexible material includes one or more pressure sensors dispersed at predetermined locations (e.g., randomly or on a grid) on the flexible material. The environmental sensor can either be attached to the flexible material, or be attached to a portion of traditional fabric worn by the user. The portion of traditional fabric may be in contact with the flexible material. For example, the flexible material may be attached to the back of a user's mobile phone. The user may put the mobile phone inside his pocket. The environmental sensors may either be inside the mobile phone attached to the flexible material, or be attached to a pocket or any other part of a user's clothing.

Figure 8:
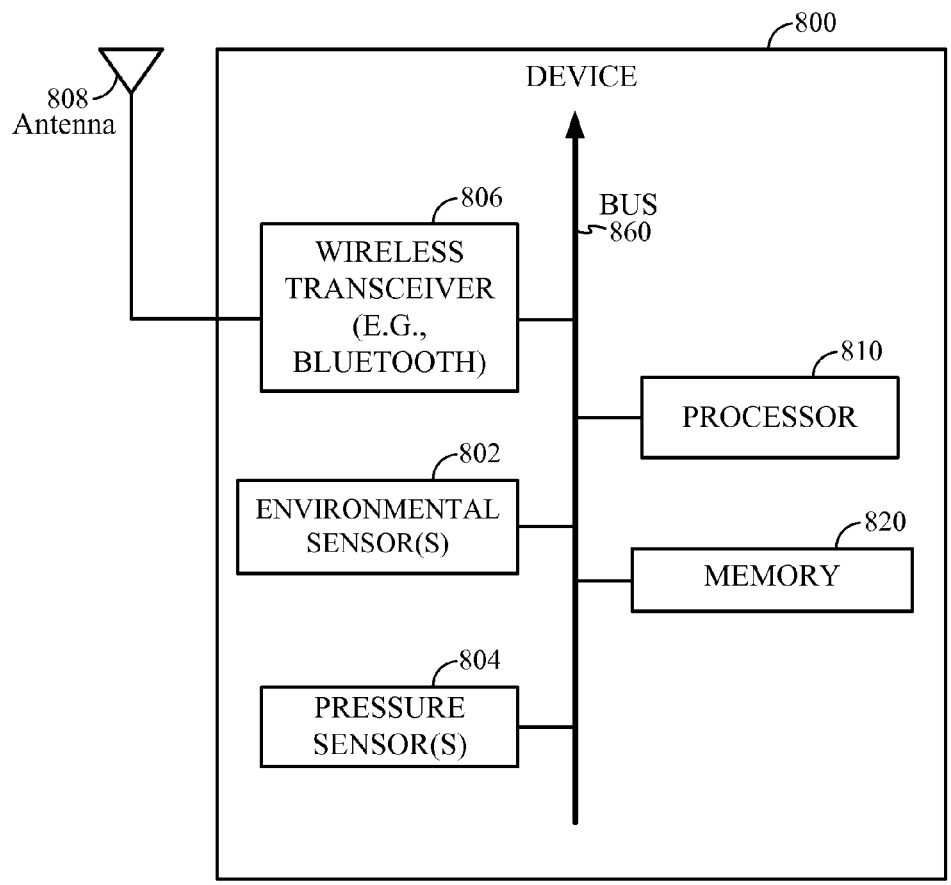
FIG. 8 describes one potential implementation of a device capable of discerning between intentional and/or unintentional gestures on a flexible material, in accordance with certain embodiments of the present disclosure.

FIG. 8 describes one potential implementation of a device 800 capable of discerning between intentional and/or unintentional gestures on a flexible material, according to one embodiment. In one embodiment, device 800 may be implemented with the specifically described details of process 700. In one example, a user may put the device in his pocket and manipulate the device while the device is still in his pocket. The flexible material may include one or more pressure sensors 804. In one embodiment, the device receives inputs from one or more of the pressure sensors 804 and/or one or more environmental sensors 802. In one embodiment, device 800 processes the received inputs using processor 810. Alternatively, the device transmits the received inputs to another device (e.g., a mobile device, a server, or any other type of devices) for processing. Processor 810 is communicatively coupled with a plurality of components within the device 800. To realize this communicative coupling, processor 810 may communicate with the other illustrated components across a bus 860.

Device 800 may include a wireless transceiver 806 coupled to one or more antennas 808 for transmitting the sensor data to other devices. The wireless transceiver may utilize Bluetooth technology or any other type of wireless technologies. The device may also include a memory 820 that is configured to store measurements from the sensors and/or any other data.

Figure 9:
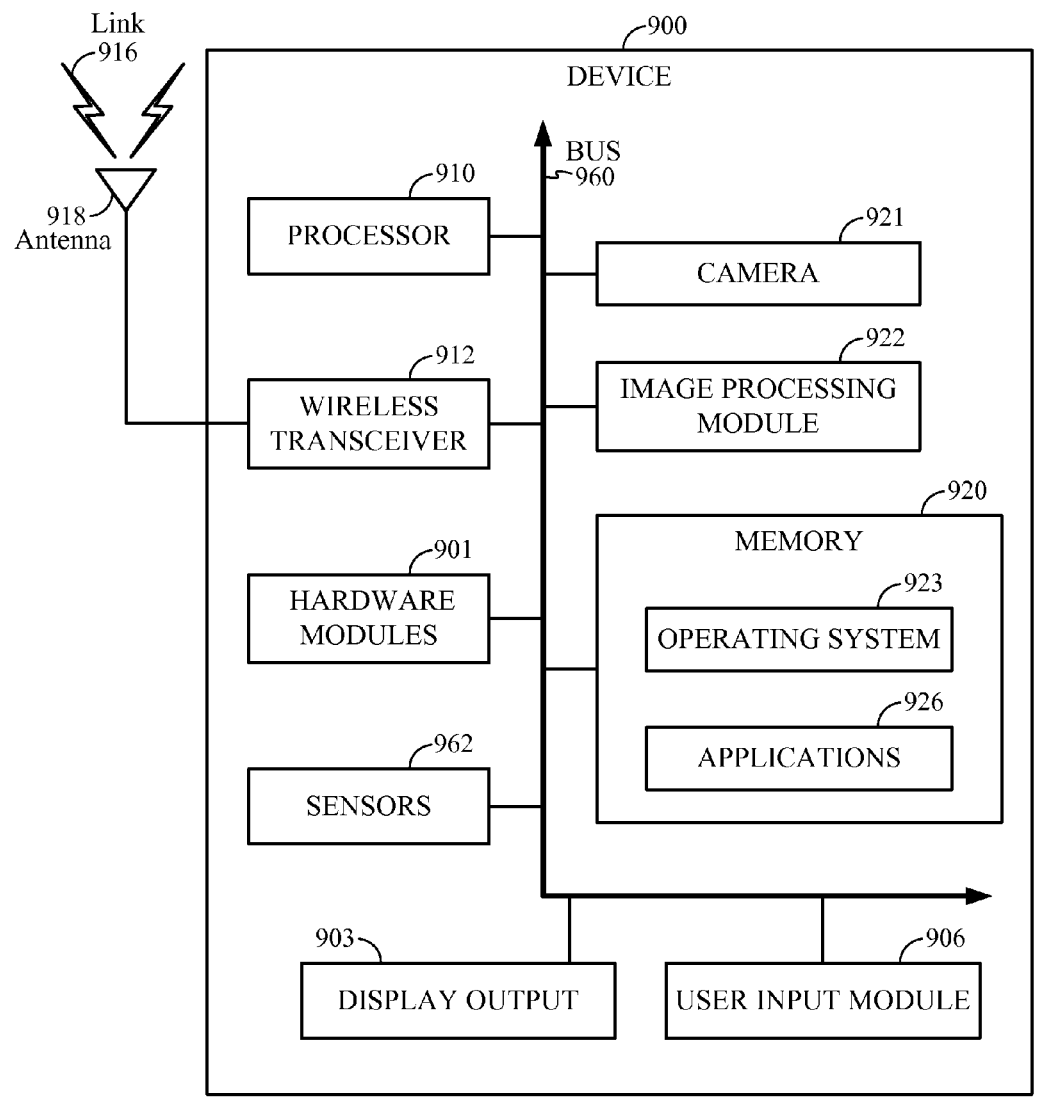
FIG. 9 describes another potential implementation of a device capable of discerning between intentional and unintentional gestures, in accordance with certain embodiments of the present disclosure.

FIG. 9 describes another potential implementation of a device 900 capable of discerning between intentional and/or unintentional gestures, according to certain embodiments. In one embodiment, device 900 may be implemented with the specifically described details of process 700. User input module 906 may accept inputs to define user preferences and gestures. Memory 920 may be configured to store measurements from sensors, and may also store settings and instructions that determine how the device operates. In one embodiment, the device may be a mobile device that has a pressure-sensitive fabric coupled to it. For example, the mobile device may have a pressure sensitive fabric on its surface, which acts as an input device. In another embodiment, the device may be a mobile device that receives the sensor data from another device (e.g., device 800 as shown in FIG. 8) and processes the data. Sensors 962 may include any number of environmental sensors and/or pressure sensors. Sensors 962 may be inside and/or outside the mobile device.

In the embodiment shown at FIG. 9, the device may be a mobile device and include processor 910 configured to execute instructions for performing operations at a number of components and can be, for example, a general-purpose processor or microprocessor suitable for implementation within a portable electronic device. Processor 910 may thus implement any or all of the specific steps for operating a pressure sensor and discerning between intentional and unintentional gestures, as described herein. Processor 910 is communicatively coupled with a plurality of components within mobile device 900. To realize this communicative coupling, processor 910 may communicate with the other illustrated components across a bus 960. Bus 960 can be any subsystem adapted to transfer data within mobile device 900. Bus 960 can be a plurality of computer buses and include additional circuitry to transfer data.

Memory 920 may be coupled to processor 910. In some embodiments, memory 920 offers both short-term and long-term storage and may in fact be divided into several units. Short term memory may store sensor measurements which may be discarded after an analysis. Alternatively, all sensor measurements may be stored in long term storage depending on user selections. Memory 920 may be volatile, such as static random access memory (SRAM) and/or dynamic random access memory (DRAM) and/or non-volatile, such as read-only memory (ROM), flash memory, and the like. Furthermore, memory 920 can include removable storage devices, such as secure digital (SD) cards. Thus, memory 920 provides storage of computer readable instructions, data structures, program modules, and other data for mobile device 900. In some embodiments, memory 920 may be distributed into different hardware modules.

In some embodiments, memory 920 stores a plurality of applications 926. Applications 926 contain particular instructions to be executed by processor 910. In alternative embodiments, other hardware modules may additionally execute certain applications or parts of applications. Memory 920 may be used to store computer readable instructions for modules that implement analyzing sensor data according to certain embodiments, and may also store the sensor data in a database.

In some embodiments, memory 920 includes an operating system 923. Operating system 923 may be operable to initiate the execution of the instructions provided by application modules and/or manage other hardware modules as well as interfaces with communication modules which may use wireless transceiver 912 and a link 916. Operating system 923 may be adapted to perform other operations across the components of mobile device 900, including threading, resource management, data storage control and other similar functionality.

In some embodiments, mobile device 900 includes a plurality of other hardware modules 901. Each of the other hardware modules 901 is a physical module within mobile device 900. However, while each of the hardware modules 901 is permanently configured as a structure, a respective one of hardware modules may be temporarily configured to perform specific functions or temporarily activated.

Other embodiments may include sensors integrated into device 900. An example of a sensor 962 can be, for example, an accelerometer, a Wi-Fi transceiver, a satellite navigation system receiver (e.g., a GPS module), a pressure sensor, a temperature module, an audio output and/or input module (e.g., a microphone), a camera module, a proximity sensor, an alternate line service (ALS) module, a capacitive touch sensor, a near field communication (NFC) module, a Bluetooth transceiver, a cellular transceiver, a magnetometer, a gyroscope, an inertial sensor (e.g., a module the combines an accelerometer and a gyroscope), an ambient light sensor, a relative humidity sensor, or any other similar module operable to provide sensory output and/or receive sensory input.

In some embodiments, one or more functions of the sensors 962 may be implemented as hardware, software, or firmware. Further, as described herein, certain hardware modules such as the accelerometer, the GPS module, the gyroscope, the inertial sensor, or other such modules may be used to provide additional information.

Mobile device 900 may include a component such as a wireless communication module which may integrate antenna 918 and wireless transceiver 912 with any other hardware, firmware, or software necessary for wireless communications. Such a wireless communication module may be configured to receive signals from various devices such as data sources via networks and access points such as a network access point. In certain embodiments, sensor data may be communicated to server computers, other mobile devices, or other networked computing devices to be stored in a remote database and used by multiple other devices when the devices execute gesture recognition functionality.

In addition to other hardware modules and applications in memory 920, mobile device 900 may have a display output 903 and a user input module 906. Display output 903 graphically presents information from mobile device 900 to the user. This information may be derived from one or more application modules, one or more hardware modules, a combination thereof, or any other suitable means for resolving graphical content for the user (e.g., by operating system 923). Display output 903 can be liquid crystal display (LCD) technology, light emitting polymer display (LPD) technology, or some other display technology. In some embodiments, display module 903 is a capacitive or resistive touch screen and may be sensitive to haptic and/or tactile contact with a user. In such embodiments, the display output 903 can comprise a multi-touch-sensitive display. Display output 903 may then be used to display any number of outputs associated with sensors 962, such as alerts, settings, thresholds, user interfaces, or other such controls.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner.

Specific details are given in the description to provide a thorough understanding of the embodiments. However, embodiments may be practiced without certain specific details. For example, well-known circuits, processes, algorithms, structures, and techniques have been mentioned without unnecessary detail in order to avoid obscuring the embodiments. This description provides example embodiments only, and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of various embodiments.

Also, some embodiments were described as processes which may be depicted in a flow with process arrows. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Additionally, the above elements may merely be a component of a larger system, wherein other rules may take precedence over or otherwise modify the application of various embodiments, and any number of steps may be undertaken before, during, or after the elements of any embodiment are implemented.

It should be noted that the method as described herein may be implemented in software. The software may in general be stored in a non-transitory storage device (e.g., memory) and carried out by a processor (e.g., a general purpose processor, a digital signal processor, and the like.)

Having described several embodiments, it will therefore be clear to a person of ordinary skill that various modifications, alternative constructions, and equivalents may be used without departing from the spirit of the disclosure.

What is claimed is:

1. A method for discerning between intended and unintended inputs on a flexible material, comprising:
   receiving a first input signal from at least one pressure sensor, the at least one pressure sensor being coupled to the flexible material to detect input from a user provided by manipulation of the flexible material;
   receiving a second input signal from at least one environmental sensor, the at least one environmental sensor being coupled to the user to detect environmental conditions associated with the user; and
   correlating the first input signal and the second input signal to determine whether the first input signal contains an intentional input by the user, wherein correlating the first input signal and the second input signal comprises comparing a first plurality of values corresponding to the first input signal with a second plurality of values corresponding to the second input signal over a common time duration.

2. The method of claim 1, wherein the at least one environmental sensor is attached to the flexible material.

3. The method of claim 1, wherein the at least one environmental sensor is attached to a portion of traditional fabric worn by the user, the portion of traditional fabric being in contact with the flexible material.

4. The method of claim 1, wherein the at least one pressure sensor is disposed at at least one predetermined location on the flexible material.

5. The method of claim 1, wherein correlating the first input signal and the second input signal comprises comparing at least one of: a number of peaks in a predefined duration, magnitude of each peak, time of start and stop of each peak, and speed of change in the first and the second input signals.

6. The method of claim 1, further comprising:
   determining that the first input signal contains an unintentional input based on a correlation between the first and the second input signals being larger than a threshold.

7. The method of claim 1, further comprising:
   determining that the first input signal contains an intentional input; and
   classifying the intentional input as one of a plurality of touch commands.

8. The method of claim 1, wherein the second input signal comprises data from the at least one environmental sensor before a start time of a potential user input and after a completion time of the potential user input.

9. An apparatus for discerning between intended and unintended inputs on a flexible material, comprising:
   means for receiving a first input signal from at least one pressure sensor, the at least one pressure sensor being coupled to the flexible material to detect input from a user provided by manipulation of the flexible material;
   means for receiving a second input signal from at least one environmental sensor, the at least one environmental sensor being coupled to the user to detect environmental conditions associated with the user; and
   means for correlating the first input signal and the second input signal to determine whether the first input signal contains an intentional input by the user, wherein correlating the first input signal and the second input signal comprises comparing a first plurality of values corresponding to the first input signal with a second plurality of values corresponding to the second input signal over a common time duration.

10. The apparatus of claim 9, wherein the at least one environmental sensor is attached to the flexible material.

11. The apparatus of claim 9, wherein the at least one environmental sensor is attached to a portion of traditional fabric worn by the user, the portion of traditional fabric being in contact with the flexible material.

12. The apparatus of claim 9, wherein the at least one pressure sensor is disposed at at least one predetermined location on the flexible material.

13. The apparatus of claim 9, wherein the means for correlating the first input signal and the second input signal comprises means for comparing at least one of:
   a number of peaks in a predefined duration, magnitude of each peak, time of start and stop of each peak, and speed of change in the first and the second input signals.

14. The apparatus of claim 9, further comprising:
   means for determining that the first input signal contains an unintentional input based on a correlation between the first and the second input signals being larger than a threshold.

15. The apparatus of claim 9, further comprising:
   means for determining that the first input signal contains an intentional input; and
   means for classifying the intentional input as one of a plurality of touch commands.

16. The apparatus of claim 9, wherein the second input signal comprises data from the at least one environmental sensor before a start time of a potential user input and after a completion time of the potential user input.

17. An apparatus for discerning between intended and unintended inputs on a flexible material, comprising:
   at least one processor configured to:
      receive a first input signal from at least one pressure sensor, the at least one pressure sensor being coupled to the flexible material to detect input from a user provided by manipulation of the flexible material;
      receive a second input signal from at least one environmental sensor, the at least one environmental sensor being coupled to the user to detect environmental conditions associated with the user; and
      correlate the first input signal and the second input signal to determine whether the first input signal contains an intentional input by the user, wherein correlating the first input signal and the second input signal comprises comparing a first plurality of values corresponding to the first input signal with a second plurality of values corresponding to the second input signal over a common time duration.

18. The apparatus of claim 17, wherein the at least one environmental sensor is attached to the flexible material.

19. The apparatus of claim 17, wherein the at least one environmental sensor is attached to a portion of traditional fabric worn by the user, the portion of traditional fabric being in contact with the flexible material.

20. The apparatus of claim 17, wherein the at least one pressure sensor is disposed at at least one predetermined location on the flexible material.

21. The apparatus of claim 17, wherein the at least one processor is further configured to correlating the first input signal and the second input signal by comparing at least one of: a number of peaks in a predefined duration, magnitude of each peak, time of start and stop of each peak, and speed of change in the first set of input signals and the second input signals.

22. The apparatus of claim 17, wherein the at least one processor is further configured to:
   determine that the first input signal contains an unintentional input based on a correlation between the first and the second input signals being larger than a threshold.

23. The apparatus of claim 17, wherein the at least one processor is further configured to:
   determine that the first input signal contains an intentional input and
   classify the intentional input as one of a plurality of touch commands.

24. The apparatus of claim 17, wherein the second input signal comprises data from the at least one environmental sensor before a start time of a potential user input and after a completion time of the potential user input.

25. A non-transitory processor-readable medium for discerning between intended and unintended inputs on a flexible material, comprising processor-readable instructions configured to cause a processor to:
   receive a first input signal from at least one pressure sensor, the at least one pressure sensor being coupled to the flexible material to detect input from a user provided by manipulation of the flexible material;
   receive a second input signal from at least one environmental sensor, the at least one environmental sensor being coupled to the user to detect environmental conditions associated with the user; and
   correlate the first input signal and the second input signal to determine whether the first input signal contains an intentional input by the user, wherein correlating the first input signal and the second input signal comprises comparing a first plurality of values corresponding to the first input signal with a second plurality of values corresponding to the second input signal over a common time duration.

26. The non-transitory processor-readable medium of claim 25, wherein the at least one environmental sensor is attached to the flexible material.

27. The non-transitory processor-readable medium of claim 25, wherein the at least one environmental sensor is attached to a portion of traditional fabric worn by the user, the portion of traditional fabric being in contact with the flexible material.

28. The non-transitory processor-readable medium of claim 25, wherein the processor-readable instructions are further configured to cause the processor to compare at least one of: a number of peaks in a predefined duration, magnitude of each peak, time of start and stop of each peak, and speed of change in the first and the second input signals.

29. The non-transitory processor-readable medium of claim 25, wherein the processor-readable instructions are further configured to cause the processor to determine that the first input signal contains an unintentional input based on a correlation between the first and the second input signals being larger than a threshold.

30. The non-transitory processor-readable medium of claim 25, wherein the second input signal comprises data from the at least one environmental sensor before a start time of a potential user input and after a completion time of the potential user input.

* * * * *